(12) United States Patent
Yamada et al.

(10) Patent No.: US 8,527,122 B2
(45) Date of Patent: Sep. 3, 2013

(54) DRIVE CONTROL DEVICE FOR HYBRID ELECTRIC VEHICLE

(75) Inventors: Kazunao Yamada, Toyota (JP); Yusuke Mizuno, Anjo (JP); Tadashi Sakai, Obu (JP)

(73) Assignee: DENSO CORPORATION, Kariya (JP)

( * ) Notice: Subject to any disclaimer, the term of this patent is extended or adjusted under 35 U.S.C. 154(b) by 279 days.

(21) Appl. No.: 12/804,483

(22) Filed: Jul. 22, 2010

(65) Prior Publication Data

US 2011/0022255 A1 Jan. 27, 2011

(30) Foreign Application Priority Data

Jul. 23, 2009 (JP) .................................. 2009-171902

(51) Int. Cl.
*B60L 9/00* (2006.01)

(52) U.S. Cl.
USPC ........ 701/22; 180/65.265; 340/438; 340/439; 701/1; 701/25; 701/36; 701/123; 703/8

(58) Field of Classification Search
USPC ............... 701/22, 102, 101, 99, 110, 95, 533, 701/532; 180/169; 340/439; 477/3, 62, 477/80; 123/399
See application file for complete search history.

(56) References Cited

U.S. PATENT DOCUMENTS

| 6,314,347 | B1 | 11/2001 | Kuroda et al. | |
|---|---|---|---|---|
| 2002/0107618 | A1* | 8/2002 | Deguchi et al. | 701/22 |
| 2008/0004761 | A1* | 1/2008 | Yamada | 701/25 |
| 2008/0071472 | A1* | 3/2008 | Yamada | 701/209 |
| 2008/0162012 | A1* | 7/2008 | Masuda et al. | 701/101 |
| 2008/0319597 | A1* | 12/2008 | Yamada | 701/22 |
| 2008/0319601 | A1* | 12/2008 | Komeda et al. | 701/29 |
| 2009/0198398 | A1 | 8/2009 | Yamada | |
| 2009/0288636 | A1* | 11/2009 | Saito et al. | 123/399 |
| 2010/0010697 | A1* | 1/2010 | Soma et al. | 701/22 |
| 2010/0106351 | A1* | 4/2010 | Hanssen et al. | 701/22 |
| 2010/0259374 | A1* | 10/2010 | Matsuo et al. | 340/439 |

FOREIGN PATENT DOCUMENTS

| JP | H-11-351942 | 12/1999 |
|---|---|---|
| JP | 2000-333305 | 11/2000 |
| JP | 2001-183150 | 7/2001 |
| JP | 2002-370560 | 12/2002 |

(Continued)

OTHER PUBLICATIONS

Office action dated Apr. 19, 2011 in corresponding Japanese Application No. 2009-171902.

*Primary Examiner* — Tuan C. To
*Assistant Examiner* — Jelani Smith
(74) *Attorney, Agent, or Firm* — Harness, Dickey & Pierce, PLC

(57) ABSTRACT

A drive control device is mounted to a hybrid electric vehicle that has an engine and a motor as a running power source, wherein the hybrid electric vehicle runs under a plurality of running modes that is switched in accordance with accelerator operation. The drive control device specifies a present position of the vehicle. The drive control device defines a schedule of the accelerator operation for each of a plurality of sections in a route from an origin to a destination in order to achieve an enhanced fuel efficient running of the vehicle. The drive control device displays a recommended accelerator operation for a present section of the plurality of sections, in which section the vehicle is presently located, in accordance with the schedule of the accelerator operation and the present position of the vehicle.

7 Claims, 10 Drawing Sheets

(56) References Cited

FOREIGN PATENT DOCUMENTS

| | | |
|---|---|---|
| JP | 2006-347214 | 12/2006 |
| JP | 2008-74321 | 4/2008 |
| JP | 2008-105559 | 5/2008 |
| JP | 2008-183937 | 8/2008 |
| JP | 2009-179215 | 8/2009 |
| WO | WO 2008/038494 | 4/2008 |

* cited by examiner

FIG. 4
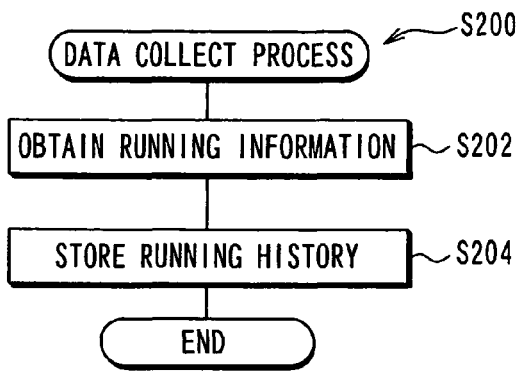
FIG. 5
(COLLECTED INFORMATION)
| ROAD IDENTIFIER | 00 | 00 | 00 | 01 | 01 | 02 | 02 | 02 | 03 | 03 | 03 |
|---|---|---|---|---|---|---|---|---|---|---|---|
| DISTANCE [m] | 00 | 05 | 10 | 15 | 20 | 25 | 30 | 35 | 40 | 45 | 50 |
| VEHICLE SPEED [km/h] | 00 | 10 | 20 | 25 | 35 | 40 | 40 | 45 | 30 | 20 | 10 |
| ROAD GRADIENT [%] | 01 | 01 | 02 | 02 | 00 | 00 | 00 | 02 | 03 | 02 | 00 |
FIG. 6
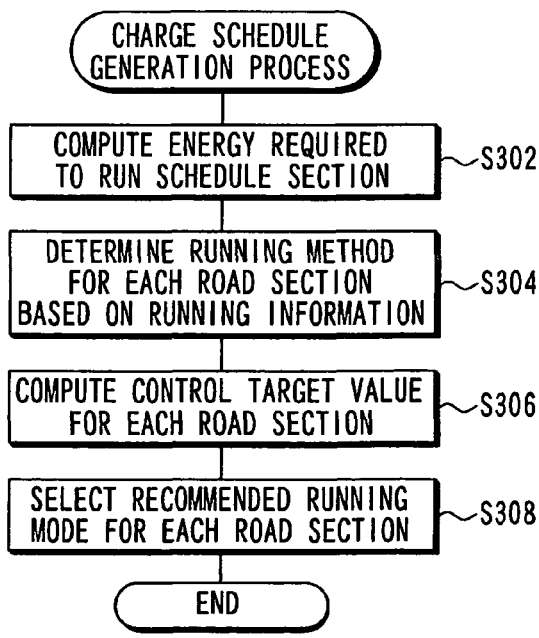

| ROAD SECTION | 1 | 2 | 3 |
|---|---|---|---|
| GENERATION EFFICIENCY | 7 | 0 | 3 |
| ASSIST EFFICIENCY | 3 | 10 | 7 |
| SCHEDULE | GENERATION | ASSIST | ASSIST |
| RUNNING MODE | HV | EV | EV |

| ROAD IDENTIFIER | 01 | 02 | 03 |
|---|---|---|---|
| ROAD SECTION | 1 | 2 | 3 |
| TARGET SOC | 70 | 60 | 55 |
| RECOMMENDED RUNNING MODE | HV | EV | EV |

DRIVE CONTROL DEVICE FOR HYBRID ELECTRIC VEHICLE

CROSS REFERENCE TO RELATED APPLICATION

This application is based on and incorporates herein by reference Japanese Patent Application No. 2009-171902 filed on Jul. 23, 2009.

BACKGROUND OF THE INVENTION

1. Field of the Invention

The present invention relates to a drive control device mounted to a hybrid electric vehicle having an engine and a motor for a running power source, and the drive control device performs a drive control of the engine and the motor.

2. Description of Related Art

A conventional display device mounted to a hybrid electric vehicle causes a display unit to display an accelerator pedal position that changes with an operation amount of an accelerator pedal, and the display unit also displays a certain accelerator pedal position, at which a running mode is switched between an EV running (or motor running) mode and an HV running (or hybrid running) mode (see, for example, JP-A-2008-74321).

Also, in a conventional drive control device of a hybrid electric vehicle, a running history, such as a vehicle speed, is collected for each of the predetermined sections, and schedule of a target value (target SOC) of a charge amount of the battery for the hybrid electric vehicle is determined for each of the predetermined sections based on the learned running history and a road state in the route to the destination in order to minimize the fuel consumption to the destination. Then, the drive control device performs drive control of the engine and the motor based on the schedule in order to cause the charge amount of the battery of the hybrid electric vehicle for each section to coincide with the target SOC (see, for example, JP-A-2000-333305 corresponding to U.S. Pat. No. 6,314,347).

In the vehicle mounted with the device of JP-A-2008-74321, the driver is capable of looking at the display unit and of often executing accelerator operation that enables an EV running mode, and thereby the driver is capable of improving the fuel efficiency.

However, the device of JP-A-2000-333305, which in advance determines the schedule of the control target value for each section in the route to the destination in order to minimize the fuel consumption, and which executes the drive control of the) engine and the motor based on the schedule, may achieve more enhanced fuel efficiency than the device of JP-A-2008-74321, which merely often executes the accelerator operation that enables the EV mode running. For example, in general, in a stopping frequency section, in which the vehicle often stops, the fuel efficiency is more effectively enhanced when the EV mode running is more often used than the HV mode running. However, if the EV mode running is excessively used in the section upstream of the stopping frequency section, the residual amount of the battery may be reduced to a value lower than a certain threshold value in the stopping frequency section, and thereby the battery may be required to be charged by starting the engine while the vehicle stops in the stopping frequency section. As a result, the fuel efficiency may deteriorate disadvantageously. In the above case, the schedule is made in order to use the HV mode running often in the section upstream of the stopping frequency section, and in order to use the EV mode running in the stopping frequency section. By operating the vehicle based on the schedule, it is possible to improve the total fuel efficiency of the entirety of the sections.

However, the driver is incapable of recognizing the running mode suitable for the enhanced fuel efficient running of the vehicle position in view of the entirety of the sections in the device of JP-A-2000-333305 disadvantageously, and thereby, for example, the driver may not depress the accelerator pedal properly. More specifically, even when the vehicle runs on the section, in which the charge of the battery for the motor executed by deeply depressing the accelerator pedal is suitable for the enhanced fuel efficient running, the driver may slightly depress the accelerator pedal in the intention of more often using the EV mode running. As a result, the fuel efficiency may not be achieved as planned disadvantageously.

SUMMARY OF THE INVENTION

The present invention is made in view of the above disadvantages. Thus, it is an objective of the present invention to address at least one of the above disadvantages.

To achieve the objective of the present invention, there is provided a drive control device mounted to a hybrid electric vehicle that has an engine and a motor as a running power source, wherein the hybrid electric vehicle runs under a plurality of running modes that is switched in accordance with accelerator operation, wherein the drive control device performs a drive control of the engine and the motor, the drive control device including present position specifying means, accelerator operation schedule defining means, and display means. The present position specifying means specifies a present position of the vehicle. The accelerator operation schedule defining means defines a schedule of the accelerator operation for each of a plurality of sections in a route from an origin to a destination in order to achieve an enhanced fuel efficient running of the vehicle. The display means displays a recommended accelerator operation for a present section of the plurality of sections, in which section the vehicle is presently located, in accordance with the schedule of the accelerator operation and the present position of the vehicle.

BRIEF DESCRIPTION OF THE DRAWINGS

The invention, together with additional objectives, features and advantages thereof, will be best understood from the following description, the appended claims and the accompanying drawings in which:

FIG. 4 is a flow chart illustrating a data collecting process;

FIG. 5 is a diagram illustrating one example of running information stored in a permanent storage medium;

FIG. 6 is a flow chart for a charge schedule generation process;

DETAILED DESCRIPTION OF PREFERRED EMBODIMENTS (First Embodiment)

Figure 1:
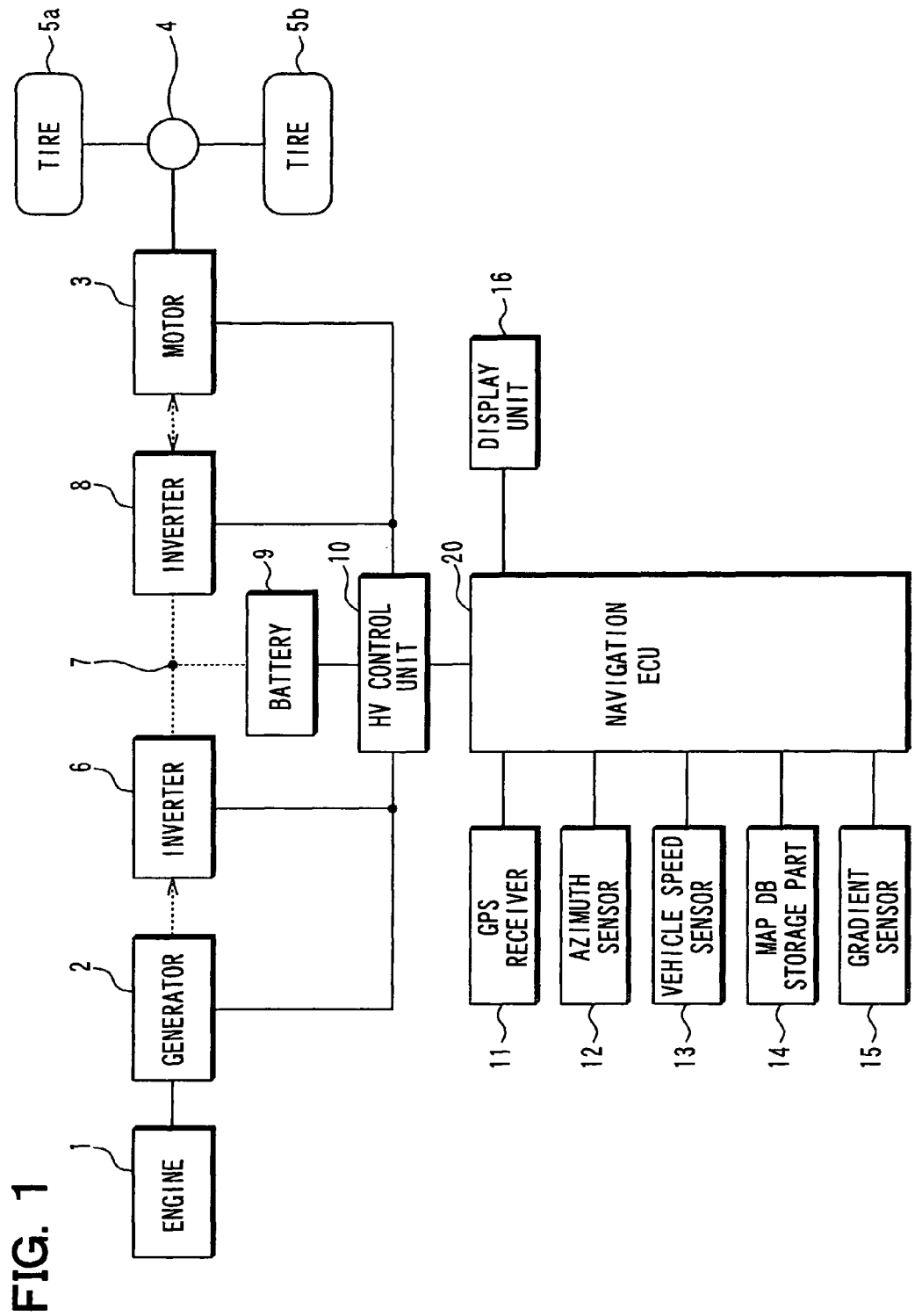
FIG. 1 is a diagram illustrating a configuration of a vehicle mounted with a drive control apparatus for a hybrid electric vehicle according to the first embodiment of the present invention.

FIG. 1 schematically illustrates a general configuration of a vehicle mounted with a drive control apparatus for controlling a hybrid electric vehicle according to the first embodiment of the present invention. The hybrid electric vehicle is equipped with an engine 1 (internal combustion engine), a generator 2, a motor 3, a differential device 4, tires 5a, 5b, an inverter 6, a DC link 7, another inverter 8, a battery 9, an HV control unit 10, a GPS receiver 11, an azimuth sensor 12, a vehicle speed sensor 13, a map DB storage part 14, a gradient sensor 15, a display unit 16, and a navigation ECU 20.

The hybrid electric vehicle employs the engine 1 and the motor 3 as a power source for running, and runs under multiple running modes in accordance with accelerator pedal operation. When the engine 1 is used as the power source, a turning force of the engine 1 is transmitted to the tires 5a, 5b through clutch mechanism and the differential device 4, both of which are not shown. Also, when the motor 3 is used as the power source, AC power of the battery 9 is converted to DC power through the DC link 7 and the inverter 8, and the DC power drives the motor 3. Then, turning force of the motor 3 is transmitted to the tires 5a, 5b through the differential device 4. In the present embodiment, there are following three running modes. In an engine running mode, only the engine 1 is used as the power source'. In a motor running mode, only the motor 3 is used as the power source. In a hybrid running mode, the engine 1 and the motor 3 are used as the power source. In the present embodiment, the hybrid running mode includes the hybrid running mode and the engine running mode.

Also, turning force of the engine 1 is transmitted to the generator 2, and the generator 2 uses the turning force to generate DC power. The generated DC power is converted to AC power through the inverter 6 and the DC link 7, and the AC power is stored in the battery 9. The charge of the battery 9 as above is performed by the operation of the engine 1 by using fuel. Thus, the above charge is referred to as engine charge in the present embodiment.

Also, when a brake mechanism (not shown) slows down the hybrid electric vehicle, a resistance force during the deceleration is applied to the motor 3 as turning force, and the motor 3 generates DC power by using the received turning force. Then, the generated DC power is converted to AC power through the inverter 8 and the DC link 7. The AC power is then stored in the battery 9. The AC power generated as above is referred to as regeneration charge in the present embodiment.

The HV control unit 10 controls execution and non-execution of the above operation of the generator 2, the motor 3, the inverter 6, the inverter 8, and the battery 9 in response to commands from the navigation ECU 20. The HV control unit 10 may be realized by using, for example, a microcomputer, and may be realized by using a hardware having a dedicated circuit configuration for enabling the flowing function.

More specifically, the HV control unit 10 stores two values including a present SOC (State Of Charge) and a reference SOC, and executes the following processes (A) and (B).

In the process (A), an operation mode of the power source is repeatedly switched between multiple running modes (motor running mode, hybrid running mode) based on the accelerator pedal position, the battery charge amount of the battery 9, and temperature of the battery 9. Also, the HV control unit 10 controls the generator 2, the motor 3, the inverter 6, and the inverter 8 by changing the value of the reference SOC based on a target SOC such that the charge amount of the battery 9 of the hybrid electric vehicle becomes close to the target SOC. For example, the above target SOC is a control target value received from the navigation ECU 20. Also, the execution and the non-execution of the engine charge, and the execution and the non-execution of the regeneration charge are repeatedly switched. The HV control unit 10 determines the running method and controls the actuator based on the determined running method such that the present SOC is maintained at or around the target SOC.

In the process (B), the present SOC is periodically transmitted to the navigation ECU 20.

More specifically, the SOC (Battery State of Charge) indicates a residual amount of the battery, and the higher the value of the SOC is, the more residual amount exists in the battery. The present SOC indicates the present value of the SOC of the battery 9. The HV control unit 10 repeatedly updates the value of the present SOC by sequentially detecting the state of the battery 9. The reference SOC serves as a control target value (for example, 60%) used by the HV control unit 10 for determining the control method, such as generation and assist. The value is changeable based on control from the navigation ECU 20.

The HV control unit 10 switches the running modes of the hybrid electric vehicle based on the control target value received from the navigation ECU 20. Also, the HV control unit 10 also switches execution and non-execution of the engine charge, and execution and non-execution of the regeneration charge based on the control target value. The control target value of the present embodiment is the target SOC. The HV control unit 10 determines the running method such that the present SOC is maintained around the target SOC, and then the HV control unit 10 executes the control of the actuator based on the determined running method.

The GPS receiver 11, the azimuth sensor 12, and the vehicle speed sensor 13 are known sensors for detecting the position of the hybrid vehicle, the travel direction of the hybrid vehicle, and the running speed of the hybrid vehicle, respectively. The map DB storage part 14 serves as a storage medium that stores map data.

The map data includes (a) node data items that correspond to respective multiple intersections and (b) link data items that correspond to respective links (in other words, road sections between the intersections. Each of the node data items includes an identification number, position information, and type information of the corresponding node. Also, each of the link data items includes an identification number (referred to as link ID), position information, and type information of the corresponding link.

The position information of the link includes position data of a shape formation point within the link, nodes of both ends of the link, and data of segments that are located on both side of the shape formation point. Data of each segment includes an segment ID, a gradient, a direction, and a length of the segment.

The gradient sensor 15 includes a gyrosensor that detects change amounts of the vehicle in a pitch direction, in a yaw direction, and in a roll direction. The change amount in the pitch direction detected by the gyrosensor is used for computing the road gradient, and information indicating the road gradient is outputted.

The display unit 16 is provided, for example, within a meter in an instrument panel of the vehicle, and includes an indicator that indicates the accelerator pedal position.

Figure 2:
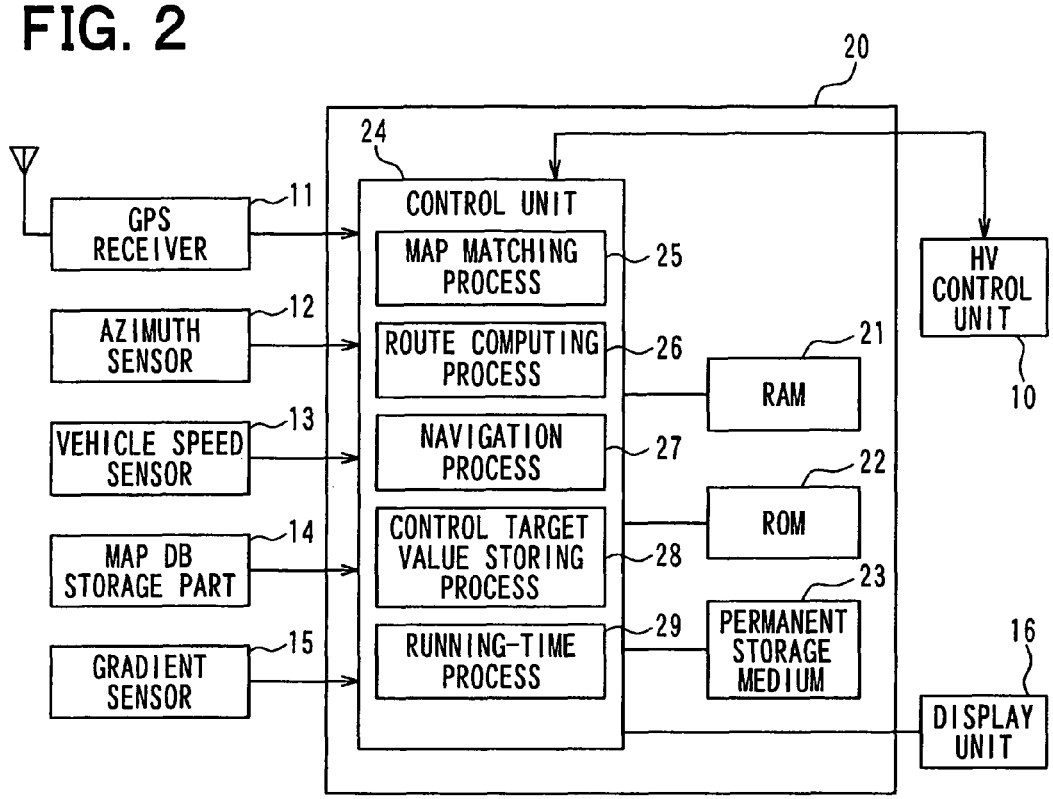
FIG. 2 is a diagram illustrating a configuration of a navigation ECU.

As shown in FIG. 2, the navigation ECU 20 includes a RAM 21, a ROM 22, a writable permanent storage medium 23, and a control unit 24. The permanent storage medium 23 is capable of keeping data even when supply from a main power source of the navigation ECU 20 stops. The permanent storage medium 23 may be, for example, a hard disk, a flash memory, a non-volatile storage medium (e.g., EEPROM), and a back-up RAM.

The control unit 24 executes programs retrieved from the ROM 22 or the permanent storage medium 23. In the execution of the programs, the control unit 24 reads information from the RAM 21, the ROM 22, and the permanent storage medium 23 and write information on the RAM 21 and the permanent storage medium 23. Thus, the control unit 24 enables the exchange of signals with the HV control unit 10, the GPS receiver 11, the azimuth sensor 12, the vehicle speed sensor 13, the map DB storage part 14, and the gradient sensor 15. It should be noted that the control unit 24 executes a present position obtaining process, in which a present position is obtained based on information sets are obtained through the GPS receiver 11, the azimuth sensor 12, and the vehicle speed sensor 13 in order to specify the present position of the vehicle.

Also, as shown in FIG. 2, the control unit 24 enables a map matching process 25, a route computing process 26, a navigation process 27, a control target value storing process 28, and a running-time process 29 by executing predetermined programs.

In the map matching process 25, the control unit 24 determines a road in a map of the map DB storage part 14, on which the present position of the vehicle corresponds to, based on the position information sets retrieved from the GPS receiver 11, the azimuth sensor 12, and the vehicle speed sensor 13.

In the route computing process 26, the control unit 24 employs the map data to determine an optimum route to a destination that is designated by the user through an operation apparatus (not shown).

In the navigation process 27, the control unit 24 provides the driver with the guidance for guiding the hybrid electric vehicle to the destination along a travel route by using an image display device and a speaker (not shown).

In the control target value storing process 28, the control unit 24 collects running information at predetermined running distance intervals while the vehicle runs in a route from the origin to the destination (target point), and the control unit 24 stores the collected information in the permanent storage medium 23. Also, the control unit 24 defines a schedule of the target SOC for each of the predetermined sections within the route from the origin to the destination based on the running information stored in the permanent storage medium 23. The control unit 24 stores the schedule of the target SOC in the permanent storage medium 23. Also, in the running-time process 29 shown in FIG. 10, when it is determined, at the next departure, that the schedule of the target SOC, which is associated with the origin and the destination of the route of interest, has been stored in the permanent storage medium 23, the control unit 24 performs the drive control of the engine and the motor based on the schedule of the target SOC stored in the permanent storage medium 23.

Figure 3:
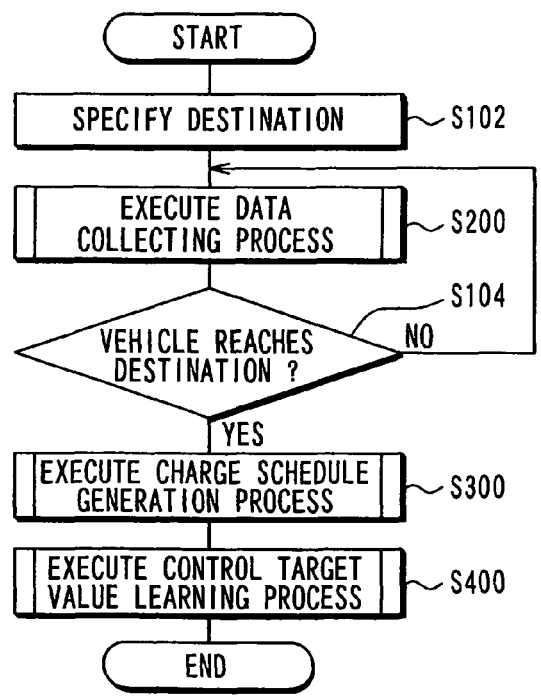
FIG. 3 is a flow chart illustrating a control target value storing process.

FIG. 3 shows a flow chart of the control target value storing process 28. When an ignition switch of the vehicle is turned on, the drive control apparatus is under operation, and thereby the control unit 24 executes various processes. For example, the control unit 24 executes the process shown in FIG. 3 in response to the operation of the occupant.

Firstly, the destination is designated at S102. Specifically, the screen for requesting the occupant to input the destination is displayed, and a point or a facility designated by the occupant through the operation in the screen is specified or set as the destination.

Next, a data collecting process is executed to collect running information at S200. FIG. 4 shows a flow chart of the data collecting process S200.

The control unit 24, firstly, obtains the running information at S202 while the vehicle runs. In the present embodiment, the control unit 24 collects, at every predetermined distance (for example, 5 meters), a vehicle speed (km/h), a road gradient (%), and a drive force (W), a running time period (second) in the section, a vehicle resting rate (%) within the section, and an electrical load (W) for driving the motor 3. Also, simultaneously, a road identifier of the road, on which the vehicle is currently located, is specified with reference to the map data. In the above, the vehicle resting time period indicates a time period, during which the vehicle is at rest or stops, and the running time period indicates a time period, during which the vehicle is running.

Next, a running history is stored at S204. Specifically, the running information sets collected at S202 are associated with the road identifier of the road, on which the vehicle is located, and the permanent storage medium 23 is caused to store the associated information sets.

FIG. 5 shows one example of the running information stored in the permanent storage medium 23. It should be noted that FIG. 5 mainly illustrates the vehicle speed and the road gradient. As shown in FIG. 5, the running information sets (e.g., the vehicle speed and the road gradient), which are collected at predetermined distance intervals, are associated with the corresponding road identifier, and are stored in the permanent storage medium 23. It should be noted that road identifier serves as the link ID or the segment ID used for identifying each road section, for example.

In FIG. 3, it is determined at S104 whether the vehicle has reached the destination. More specifically, it is determined whether the vehicle has reached the destination by determining whether the present position of the vehicle falls within a certain range from the destination.

When the present position of the vehicle falls beyond the certain range of the destination, corresponding to NO at S104, the data collecting process at S200 is repeated. In other words, the process is repeated, in which the running information sets are collected at predetermined distance intervals, and in which the permanent storage medium 23 is caused to stored the above collected information sets associated with the road identifier.

When the present position of the vehicle falls within the certain range from the destination, corresponding to YES at S104, control proceeds to S300 for executing a charge schedule generation process. FIG. 6 shows a flow chart of the charge schedule generation process S300. In the charge schedule generation process S300, the schedule of the running methods of the vehicle in a schedule section is made as the charge schedule of the schedule section.

Specifically, firstly, the schedule section is defined as a travel route from the origin to the destination, and at S302, the energy required for the vehicle to run the schedule section is computed based on the running information collected and stored in the permanent storage medium 23 during the previous vehicle running from the origin to the destination. It should be noted that a method for computing the required energy is a known art (see, for example, JP-A-2001-183150, JP-A-2008-183937, "development of new energy automobile P. 123 to 124" CMC Publishing Co., Ltd.). Thus, the description of the computation is omitted.

Figures 7A, 7B, 8:
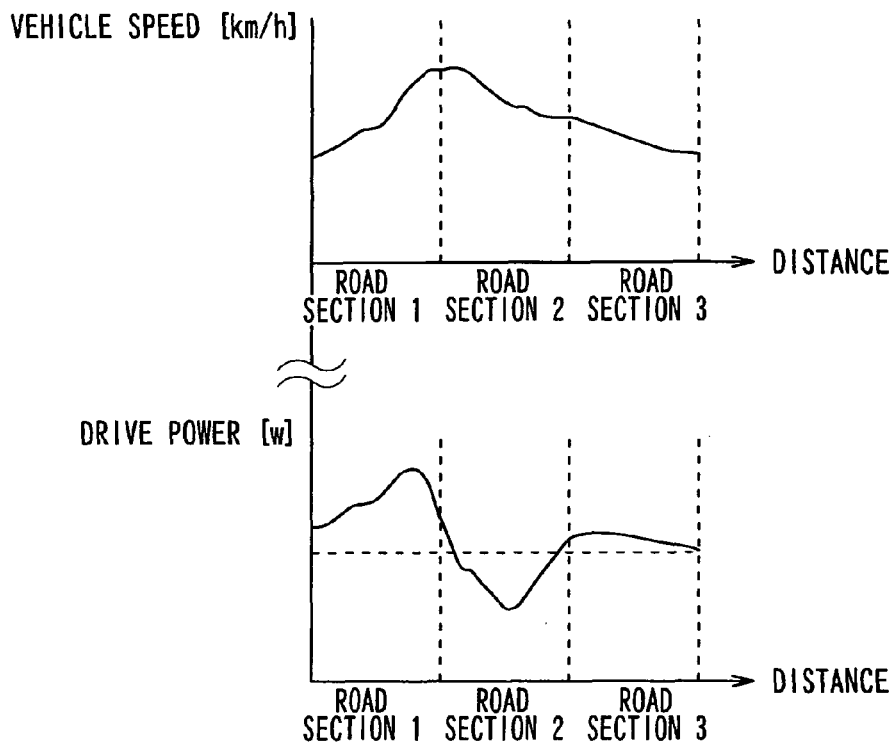
FIG. 7A is a diagram illustrating one example of a vehicle speed and a drive force collected in a schedule section.
FIG. 7B is a diagram illustrating one example of a running method determined for each road section in the schedule section.
FIG. 8 is a diagram illustrating one example of an estimated transition of a target SOC and a recommended running mode.

Next, control proceeds to at S304, where the running method for each road identifier (corresponding to road section) is determined based on the running information stored in the permanent storage medium 23. Specifically, the reference SOC is retrieved from the HV control unit 10, and power generation efficiency and assist efficiency are computed for the schedule section from the origin to the destination based on the reference SOC and the running information, which is stored in the permanent storage medium 23 during the vehicle running from the origin to the destination. Then, the control method, such as the regeneration charge, power-generation-oriented operation, assist-oriented operation, are determined for each road identifier in the schedule section based on the power generation efficiency and the assist efficiency. FIG. 7A illustrates one example of the vehicle speed and the drive power in a schedule section. In FIG. 7A, drive force is equal to a required running energy. Also, FIG. 7B illustrates one example of a determined running method of each road identifier in the schedule section.

Next, at S306, an SOC management schedule (corresponding to the schedule of the control index) for the entire sections is generated based on the running information, which has been collected and stored in the permanent storage medium 23 while the vehicle runs from the origin to the destination. The SOC management schedule indicates an estimated change of the target SOC (control target value) on the route to the destination. For example, the SOC management schedule is designed such that the target SOC is increased in the upstream road section located immediately before the downstream road section, in which the stopping frequency of the vehicle stop is relatively large. Also, the SOC management schedule is designed such that the target SOC is reduced in the downstream road section. It should be noted that the estimation of the change of the target SOC is already known (see, for example, JP-A-2008-183937), and thereby the details are not described. In the above, the stopping frequency of a certain road section indicates the number of times, by which the vehicle stops while the vehicle runs in the certain road section.

Next, a recommended running mode is selected for each road section at S308. In the present embodiment; the recommended running mode is one of (a) the hybrid running mode, in which the battery 9 is charged, and (b) the motor running mode, in which the battery 9 is not charged. More specifically, the hybrid running mode is selected as the recommended running mode for the road section (a battery charge section), in which the target SOC is scheduled to be increased. In contrast, the motor running mode is selected as the recommended running mode for another road section (a battery consumption section), in which the target SOC is scheduled to be reduced. In the vehicle running, in order to operate the vehicle under the running mode, where the battery 9 is to be charged, an accelerator operation needs to be performed, in which operation the accelerator pedal is required to be deeply depressed such that the accelerator pedal position becomes relatively large. In contrast, in order to operate the vehicle in the other running mode, where the battery 9 is not charged, another accelerator operation needs to be performed, in which operation the accelerator pedal is slightly depressed such that the accelerator pedal position becomes relatively small. As above, the schedule of the recommended running mode for each road section is defined.

FIG. 8 illustrates one example of an estimated transition of the target SOC and the recommended running mode. It should be noted that the target SOC shown in FIG. 8 indicates a value at the end point of each road section. Although not shown in FIG. 8, the target SOC at a start of a road section 1 indicates 60. Because the target SOC increases from 60 to 70 in the road section 1, the hybrid running mode is selected as the recommended running mode for the road section 1 in order to charge the battery 9. In contrast, because the target SOC is reduced in road sections 2 and 3, the motor running mode is selected as the recommended running mode for the road sections 2 and 3 in order to operated the vehicle under the motor drive using the energy of the battery 9. As above, the SOC management schedule that defines the target SOC and the recommended running mode for each road section is generated.

Figure 9:
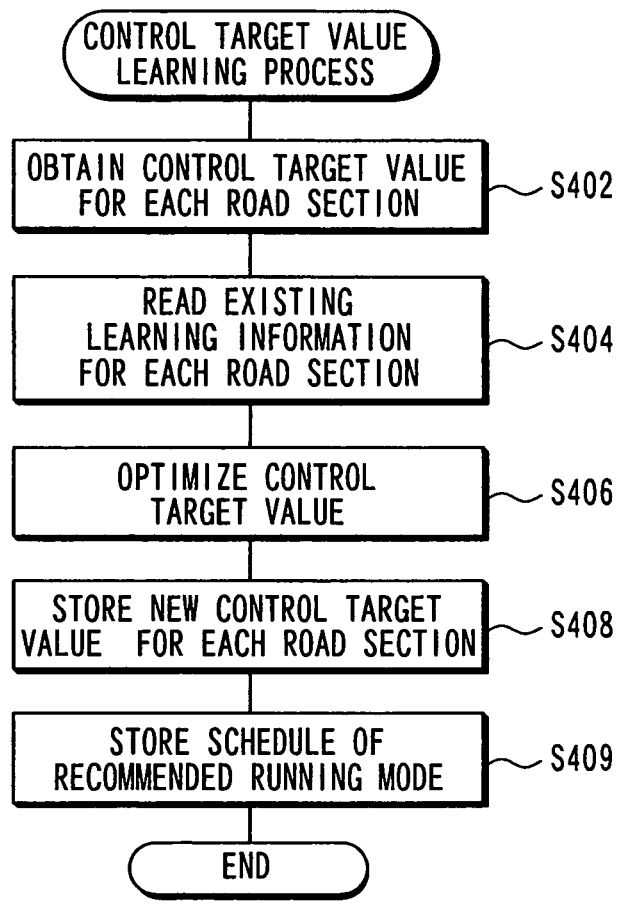
FIG. 9 is a flow chart illustrating a control target value learning process.

In FIG. 3, next, a control target value learning process S400 is executed in order to learn the control target value and store the control target value in the permanent storage medium 23. The flow chart of the control target value learning process S400 is shown in FIG. 9.

In the control target value learning process, firstly, the control target value is obtained for each road section at S402. Specifically, each control target value (the target SOC), which has been computed correspondingly to the road identifier in the SOC management schedule, is obtained from the permanent storage medium 23.

Next, existing learning information is read for each road section at S404. In other words, when a control target value of the schedule section of interest, on which the vehicle has just run, has been previously computed and been already stored in the permanent storage medium 23, the control target value of the schedule section of interest is read from the permanent storage medium 23. It should be noted that when the previous control target value of the schedule section of interest has not yet been stored in the permanent storage medium 23, the control target value is not read and control proceeds to S406.

At S406, the control target value is optimized for each road section. When the previous control target value of the schedule section of interest has already been stored in the permanent storage medium 23, the previous control target value of the schedule section of interest stored in the permanent storage medium 23 and the control target value currently obtained at S402 are simply averaged to obtain an average value that serves as a new control target value. In contrast, when the previous control target value of the schedule section of interest has not yet been stored in the permanent storage medium 23, the control target value obtained at S402 is made serve as the new control target value.

Next, the new control target value is stored in the permanent storage medium 23 at S408. Specifically, each control target value (the target SOC), which is associated with the origin, the destination, and the road identifier, is stored in the permanent storage medium 23.

Next, a schedule of the recommended running mode is stored at S409. More specifically, the schedule of the recommended running mode for each road section is defined at S409 based on the control target value, which is stored in the permanent storage medium 23 at S408, similarly to the process shown in S308. Then, the defined schedule of the recommended running mode is stored in the permanent storage medium 23. As above, the schedule of the recommended running mode is defined based on the control target value learned for each road section, and is stored in the permanent storage medium 23.

Figure 10:
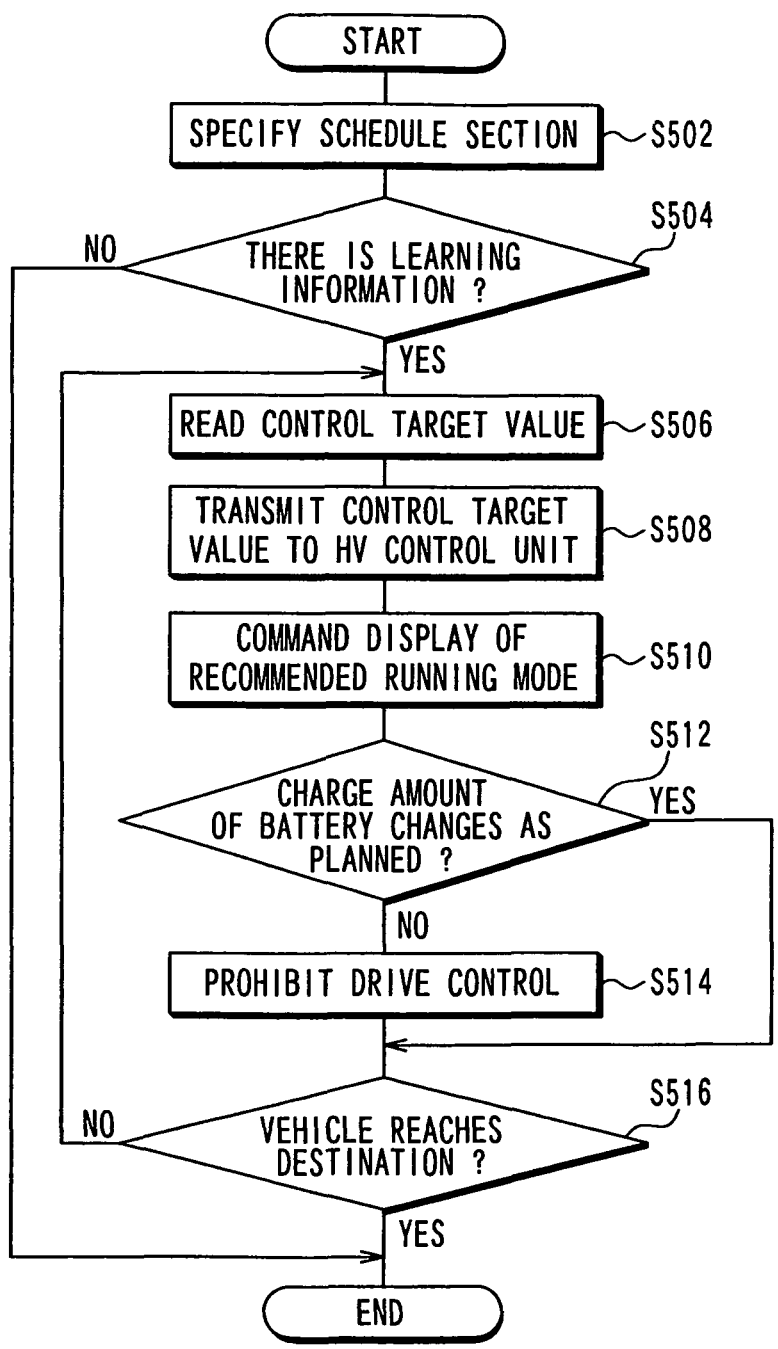
FIG. 10 is a flow chart during a running-time process.

Next, the running-time process 29 will be described. FIG. 10 shows a flow chart of the running-time process 29. After turning on the ignition switch of the vehicle, the process in FIG. 10 is executed in accordance with the destination set by the occupant.

Firstly, the schedule effective section is specified at S502. Specifically, when the destination is specified by the occupant, a route from the present position of the vehicle (or the origin) to the destination is specified as the schedule section.

Next, it is determined at S504 whether there is learning information. Specifically, when the previously computed SOC management schedule for the road sections in the schedule section of interest (or for the presently specified route) from the origin to the destination is stored in the permanent storage medium 23, it is determined that there is the learning information.

When the previously computed SOC management schedule for the road sections in the schedule section of interest is stored in the permanent storage medium 23, corresponding to YES at S504, control proceeds to S506, where the control target value is read. Specifically, the control target value of each road section, which value has been previously defined in the SOC management schedule for the schedule section, is read from the permanent storage medium 23.

Next, the control target value (target SOC) for a road section, in which the vehicle is located, is transmitted to the HV control unit 10 at S508. It should be noted that the HV control unit 10 changes the value of the reference SOC based on the control target value (target SOC) in order to control the generator 2, the motor 3, the inverter 6, and the inverter 8 such that the charge amount of the battery 9 of the hybrid electric vehicle becomes closer to the target SOC.

Next, the display of the recommended running mode is commanded at S510. Specifically, the information indicating the recommended running mode for the road section, in which the vehicle is located, is transmitted to the display unit 16.

The display unit 16 causes a range of accelerator pedal position, which corresponds to the recommended running mode, to flash on and off at the indicator in accordance with the input of the information indicating the recommended running mode.

Figure 11A:
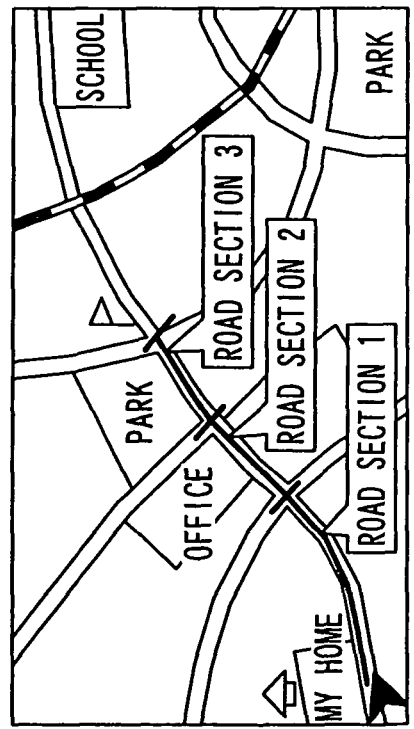
FIG. 11A is a diagram for explaining a display unit of the first embodiment.
Figure 11C:
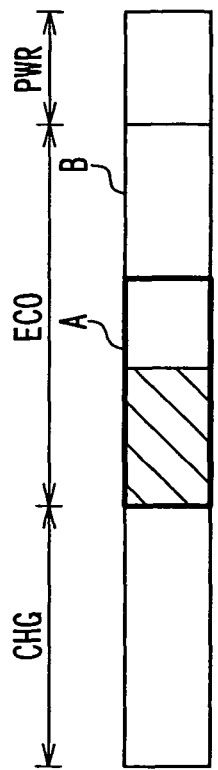
FIG. 11C is a diagram for explaining the indicator of the display unit for a road section 2 and for a road section 3 of the first embodiment.

The display of the display unit 16 will be described with reference to FIGS. 11A to 11C. FIG. 11A shows the schedule section (road sections 1 to 3) in a map format. The recommended running mode for the road section 1 is the hybrid running mode (HV running mode), and the recommended running mode for the road sections 2 and 3 is the motor running mode (EV running mode).

Figure 11B:
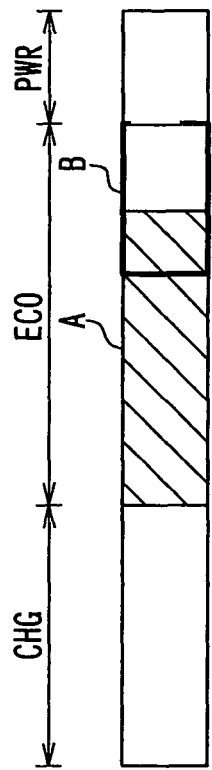
FIG. 11B is a diagram for explaining an indicator of the display unit for a road section 1 of the first embodiment.

FIG. 11B is a display example of the indicator in the display unit 16 while the vehicle runs on the road section 1 shown in FIG. 11A. FIG. 11C is an display example of the indicator in the display unit 16 while the vehicle runs on the road sections 2 and 3 shown in FIG. 11A.

The display unit 16 indicates a charge area (CHG), an economical area (ECO), and a power consuming area (PWR). The charge area (CHG) indicates that the battery is regenerated. The economical area (ECO) indicates that the vehicle runs under a fuel efficiency state. The power consuming area (PWR) indicates that the vehicle runs under a fuel inefficiency state.

When the driver depresses the accelerator pedal, and thereby the accelerator pedal position is increased, an area (shaded area) indicating the accelerator pedal position extends from a left end of the economical area (ECO) toward the right. In practice, the area (shaded area) indicating the accelerator pedal position is illuminated by an LED to be brighter than the other area, and thereby apparently the area indicating the accelerator pedal position extends in the right direction in FIGS. 11B and 11C. Also, in the present embodiment, the accelerator pedal position of the vehicle is displayed in the indicator such that the area indicating the accelerator pedal position increases in proportion to an increase of the accelerator pedal position.

Also, a target zone flashes on and off in the economical area (ECO), and the target zone indicates a suitable range of the accelerator pedal position that enables a running mode suitable for an enhanced fuel efficient running of the vehicle for the present vehicle position. Specifically, when the vehicle runs on the road section 1, an HV running zone B (surrounded by thick line as shown in FIG. 11B), which corresponds to the range indicating the accelerator pedal position that enables the HV running mode, flashes on and off. Also, when the vehicle runs on the road sections 2 and 3, an EV running zone A (surrounded by thick line as shown in FIG. 11C), which corresponds to the range indicating the accelerator pedal position that enables the EV running mode, flashes on and off. It should be noted that each of the target zones A, B, which corresponds to the range indicating the accelerator pedal position that enables the recommended running mode suitable for the enhanced fuel efficient running, serves as a recommended accelerator operation for the road section, in which the vehicle is located. Also, the display of the target zones A, B are highlighted by at least one of the thick line and flashing thereof as above, for example.

When the vehicle runs on the road section 1, the HV running zone B flashes on and off. Thus, it is possible for the driver to effectively recognize the HV running zone B, and thereby to perform the accelerator operation, in which the driver depresses the accelerator pedal relatively deeply in order to cause the area (shaded area), which indicates the present accelerator pedal position, to extend to the HV running zone B. In contrast, when the vehicle runs on the road sections 2 and 3, the EV running zone A flashes on and off. Thus, it is possible for the driver to accordingly perform the other accelerator operation, in which the driver depresses the accelerator pedal relatively lightly in order to cause the area (shaded area) indicating the accelerator pedal position to be located within the EV running zone A. As a result, it is possible to achieve the enhanced fuel efficient running in total for the entirety of the schedule section.

It is determined at S512 whether the present SOC changes to become closer to the control target value (target SOC) in order to determine whether the charge amount of The battery 9 changes as planned or accordingly to the SOC management schedule.

When the present SOC changes to become closer to the control target value, corresponding to YES at S512, control proceeds to S516, where it is determined whether the vehicle has reached a position within a predetermined range from the destination in order to determine whether the vehicle has reached the destination.

When it is determined that the vehicle has not reached the position within the predetermined range from the destination, corresponding to NO at S516, control returns to S506.

Also, when it is determined that the present SOC does not change to become closer to the control target value, corresponding to NO at S512, control proceeds to S514, where the drive control is prohibited even before the vehicle reaches a position located within a predetermined range from the destination. Specifically, at S514, the transmission of the control target value is prohibited. In the above case, the HV control unit 10 performs a drive control such that the charge amount (SOC) of the battery 9 becomes closer to a default control target value, such as the reference SOC of 60%. Also, the display of the target zone, such as the EV running zone A, the HV running zone B, is also prohibited.

When the vehicle reaches the position within the predetermined range from the destination, corresponding to YES at S516, the process is ended.

Due to the above configuration, the schedule of the target SOC is defined for each of the multiple sections in the route (schedule section) from the origin to the destination in order to achieve the enhanced fuel efficient running of the vehicle, and the defined schedule is stored in the storage device. Then, the schedule of the recommended running mode is defined for each of the multiple sections based on the schedule of the target SOC, and an accelerator operation for causing the recommended running mode of the road section, in which the vehicle is located, is displayed based on the schedule of the recommended running mode and the present position of the vehicle. As a result, the driver is capable of recognizing the accelerator operation suitable for the enhanced fuel efficient running, and thereby it is possible to effectively improve the fuel efficiency of the hybrid electric vehicle.

Also, the accelerator pedal position of the vehicle is displayed such that the area indicating the accelerator pedal position is increased in proportion to the accelerator pedal position in the present embodiment. Also, it is possible to highlight the display of the range of accelerator pedal position, which enables the running mode suitable for the enhanced fuel efficient running, at different positions on the indicator for different running modes.

It should be noted that in the present embodiment, as shown in S308, the schedule of the recommended running mode is defined for the road sections (or for each of the multiple sections) in the route from the origin to the destination in order to achieve the enhanced fuel efficient running of the vehicle, and the accelerator operation that enables the recommended running mode for the present road section, in which the vehicle is presently located, is displayed based on the recommended accelerator operation schedule and the present position of the vehicle. However, alternatively, the schedule of the accelerator operation that enables the enhanced fuel efficient running may be directly defined instead of the schedule of the recommended running mode that enables the enhanced fuel efficient running. Then, the recommended accelerator operation for the road section, in which the vehicle is located, may be displayed based on the accelerator operation schedule and the present position of the vehicle. In the above alternative method, for example, the schedule of the accelerator operation for achieving the enhanced fuel efficient running is defined such that the accelerator operation is switched as required between (a) the operation for charging the battery that drives the motor and (b) the operation for not charging the battery that drives the motor.

(Second Embodiment)

Figure 12C:
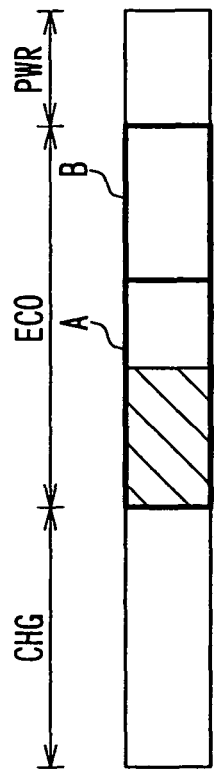
FIG. 12C is a diagram for explaining the indicator of a display unit for a road section 2 and for a road section 3 of the second embodiment.
Figure 12B:
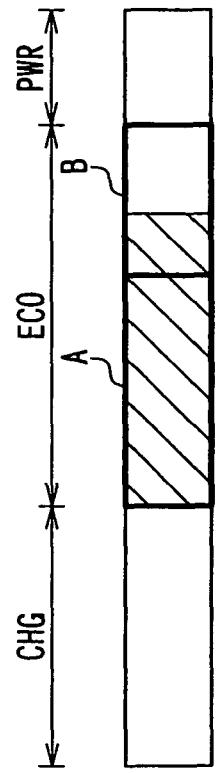
FIG. 12B is a diagram for explaining an indicator of a display unit for the road section 1 of the second embodiment.
Figure 12A:
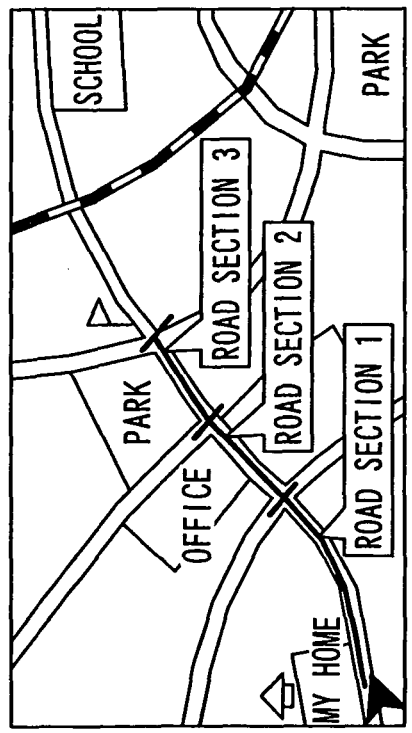
FIG. 12A is a diagram for explaining a display unit of the second embodiment of the present invention.

FIGS. 12A to 12C illustrate display examples of the display unit 16 according to the second embodiment. FIG. 12A illustrates a map format of the schedule section (the road section 1 to 3), and FIGS. 12B and 12C illustrate the display examples of the indicator for each road section in the schedule section shown in FIG. 12A. In the first embodiment, as shown in FIGS. 11B and 11C, the accelerator pedal position of the vehicle is displayed in the following manner. The area (shaded part) indicating the accelerator pedal position is increased in proportion to the accelerator pedal position, and the range A, B of accelerator pedal position, which corresponds to the recommended running mode, flashes on and off at different positions on the indicator for different running modes. In the present embodiment, as shown in FIGS. 12B and 12C, the ranges A, B of accelerator pedal position, which correspond to the respective recommended running modes, are always displayed at respective predetermined positions. In the above state, the accelerator pedal position of the vehicle is displayed in the following manner. The change rate of the area indicating the accelerator pedal position relative to the change of the accelerator pedal position is different for the different running mode. Specifically, the area (shaded area) indicating the accelerator pedal position more sharply (or more sensitively) increases with the depressing amount of the accelerator pedal during the motor running mode than the increase of the area during the hybrid running mode. As a result, an accelerator operation is executed during the motor running mode, in which operation the driver is more likely to depress the accelerator pedal relatively lightly such that the area (shaded area) indicating the accelerator pedal position is limited from extending to enter into the HV running zone B. Also, another accelerator operation is executed during the hybrid running mode, in which operation the driver is more likely to depress the accelerator pedal relatively deeply such that the area (shaded area) indicating the accelerator pedal position is caused to extend to enter into the HV running zone B.

(Third Embodiment)

Figure 13:
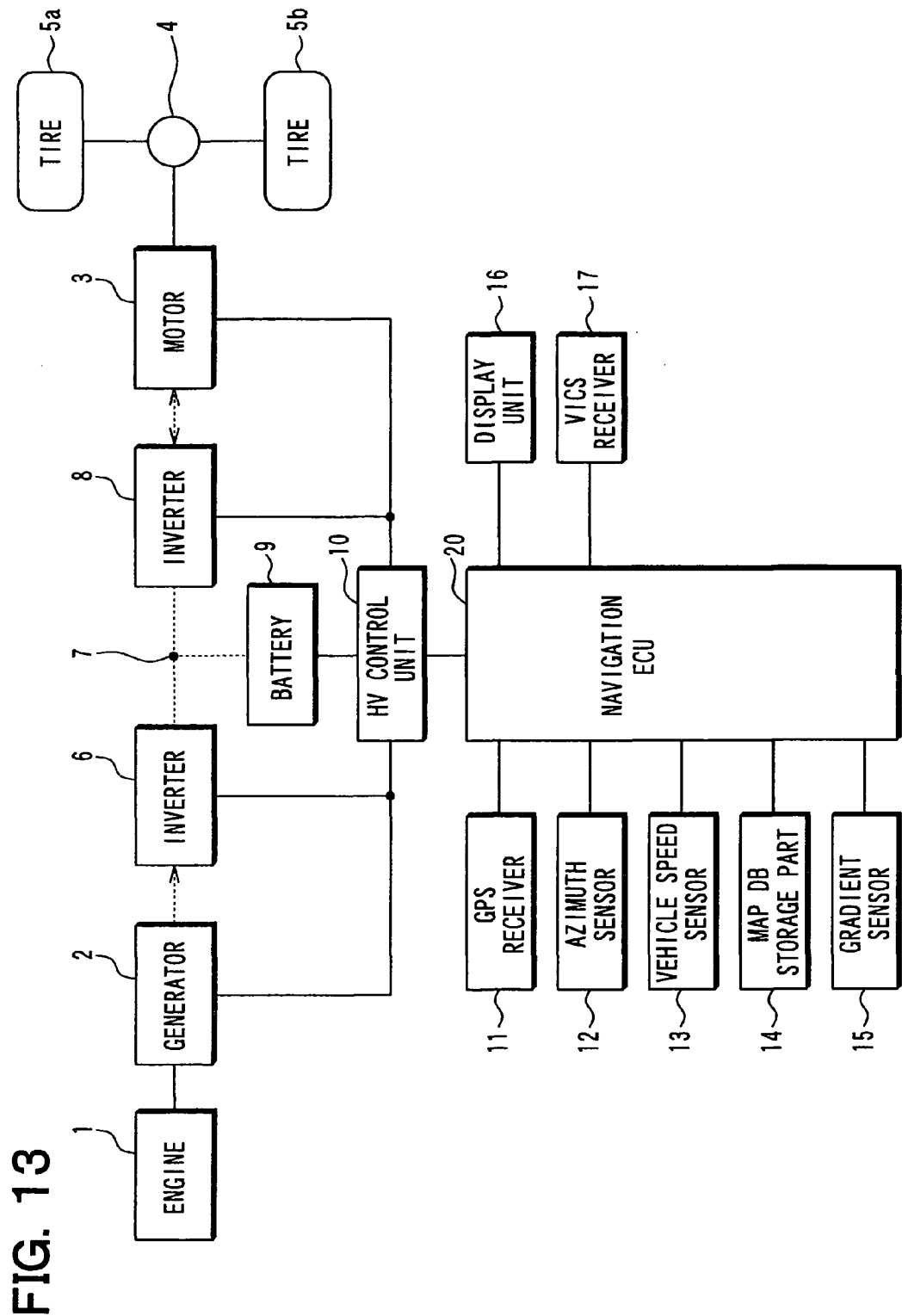
FIG. 13 is a diagram illustrating a schematic configuration of a vehicle mounted with drive control device for a hybrid electric vehicle according to the third embodiment of the present invention.

FIG. 13 is a schematic configuration that illustrates a vehicle mounted with a drive control device for a hybrid electric vehicle according to the third embodiment. The drive control device of the hybrid electric vehicle according to the present embodiment has a VICS receiver 17 in addition to the configuration shown in FIG. 1, and the VICS receiver 17 receives traffic jam information.

Also, the navigation ECU 20 of the present embodiment executes a traffic-jam-information-receiving-time process. More specifically, in the process, the navigation ECU 20 executes the control target value storing process 28 shown in FIG. 3. When the navigation ECU 20 determines that there is a traffic jam section ahead of the present position of the vehicle based on the traffic jam information received through the VICS receiver 17, the navigation ECU 20 displays the range of the accelerator pedal position, which enables the vehicle to run on the traffic jam section with the enhanced fuel efficiency (or with low fuel consumption), on the indicator.

Figure 14:
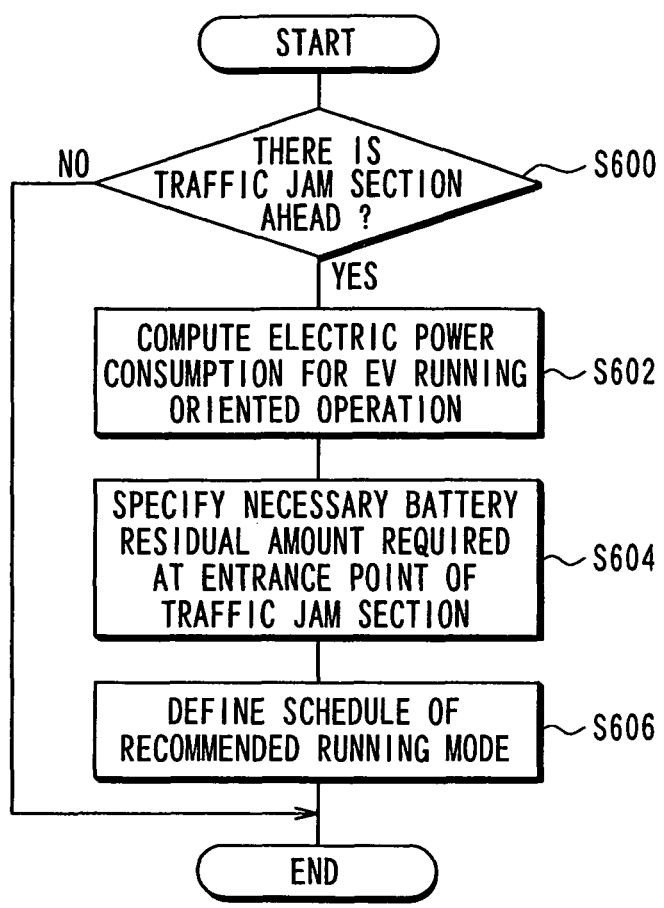
FIG. 14 is a flow chart of a traffic-jam-information-receiving-time process.

FIG. 14 illustrates a flow chart of the traffic-jam-information-receiving-time process. After executing the control target value storing process 28 shown in FIG. 2, the navigation ECU 20 executes the process shown in FIG. 14 upon receiving the traffic jam information through the VICS receiver 17. It should be noted that, in the present embodiment, the traffic jam information includes at least one of a traffic jam section (start point of the traffic jam), an average vehicle speed in the traffic jam section, a length of the traffic jam section, and a time period required for the vehicle to pass through the traffic jam section.

Firstly, it is determined at S600 whether there is a traffic jam section ahead of the vehicle based on the traffic jam information received through the VICS receiver 17.

When it is determined at S600 that there is no traffic jam section ahead, corresponding to NO at S600, the present process is ended.

Also, when it is determined at S600 that there is the traffic jam section ahead, control proceeds to S602, where the navigation ECU 20 specifies an electric power consumption of the battery 9 for a case, where the vehicle runs on the traffic jam section under the EV running oriented operation. More specifically, in the present embodiment, the navigation ECU 20 computes the electric power consumption of the battery 9 that drives the motor 3 while the vehicle travels on the traffic jam section under the EV running mode. In the above, the electric power consumption E of the battery 9 while the vehicle runs on the traffic jam section under the EV running mode is computed by the following equation.

$$E = A \times B + D = C + D, \text{ where:}$$

A (kW) indicates an energy consumption per unit of time, which is consumed by accessories, such as an air conditioner;

B (second) indicates a time period that is required for the vehicle to pass through the traffic jam section;

C is an energy consumption consumed by the accessories in the traffic jam section; and D (kW) is an energy required when the vehicle runs on the traffic jam section under the EV running oriented operation.

In the present embodiment, the computation of the energy D(kW), which is required for the vehicle to run on the traffic jam section under the EV running operation, employs data modeled through a statistic method. For example, in the traffic jam section, in which the average vehicle speed is 10 km/h (2.7 m/sec), a "40-second running model" is employed. More specifically, in the 40-second running model, the vehicle accelerates from 0 km/h to 20 km/h in 7 seconds, and runs at a constant speed for 15 seconds. Then, the vehicle decelerates to 0 km/h in 7 seconds, and stops for 11 seconds. When the above 40-second model is used, if the length of the traffic jam section is 10 km, the energy D required for the vehicle to run on the traffic jam section under the EV running operation is computed by the following equation:

$$D = \text{"energy consumed in 40-second run"} \times 10 \text{ (km)} \div 2.7 \text{ (m/s)} \div 40 \text{ (second)}.$$

Also, if the length of the traffic jam section is 5 km, the energy D required for the vehicle to run on the traffic jam section under the EV running operation is computed by the following equation:

$$D = \text{"energy consumed in 40-second run"} \times 5 \text{ (km)} \div 2.7 \text{ (m/s)} \div 4.0 \text{ (second)}.$$

It should be noted that the "energy consumed in 40-second run" is a unique value that is predetermined for the vehicle of interest, and is stored in the permanent storage medium 23. In the present embodiment, the running model is prepared for each average vehicle speed received as the VICS information, and the energy D required for the case of each average vehicle speed is computed in the same manner based on the respective running model.

Next, a necessary battery residual amount G, which is required at the entrance point of the traffic jam section, is specified at S604. More specifically, the necessary battery residual amount G is specified based on (a) the electric power consumption E of the battery 9 while the vehicle runs on the traffic jam section under the EV running mode and (b) a predetermined lower-limit standard value F for a battery residual amount of the battery 9. Typically, the necessary battery residual amount G is specified by using a battery characteristic data indicating a characteristic of the battery residual amount relative to the electric power consumption of the battery 9. In the present embodiment, the lower-limit standard value F of the battery residual amount of the battery 9 employs a value (for example, about 35 to 50%). In the typical operation, when the battery residual amount decreases to the lower-limit standard value F, the engine 1 is activated in order to charge the battery 9, for example. When the battery residual amount is equal to or greater than the necessary battery residual amount G at the entrance point of the traffic jam section, it is assumed that the battery residual amount of the battery 9 at the end point of the traffic jam section after the running on the traffic jam section under the EV running mode will not be reduced to the lower-limit standard value F of the battery residual amount of the battery 9.

Next, control proceeds to S606, where the schedule of the recommended running mode is defined for the road sections in the route from the present position to the end point of the traffic jam section. Specifically, if the battery residual amount at the entrance point of traffic jam section is estimated to become less than the necessary battery residual amount G for a case, where the vehicle runs under the EV running mode until the vehicle reaches the entrance point of traffic jam section, the recommended running mode for the vehicle operation is set to the HV running mode on one or more sections upstream of the entrance point of traffic jam section such that the battery residual amount at the entrance point of traffic jam section becomes increased to be equal to or greater than the necessary battery residual amount G. Also, if the battery residual amount at the entrance point of traffic jam section is estimated to be equal to or greater than the necessary battery residual amount G even when the vehicle is operated under the EV running mode until the vehicle reaches the entrance point of traffic jam section, the recommended running mode on a section upstream of the traffic jam section and on the traffic jam section is set to the EV running mode.

When the schedule of the recommended running mode is defined in the traffic-jam-information-receiving-time process as above, the range of the accelerator pedal position corresponding to the recommended running mode for the road section, in which the vehicle is located, is displayed in the indicator in the running-time process. More specifically, the recommended running mode for the road section, in which the vehicle is located, is determined based on (a) the schedule of the recommended running mode defined in the traffic-jam-information-receiving-time process and (b) the present position of the vehicle.

In the present embodiment, the schedule of the recommended running mode is defined without defining the schedule of the control index (target SOC) as above.

The above configuration includes receiving means (the VICS receiver 17) for receiving traffic jam information, electric power consumption computing means (S602), and necessary battery residual amount specifying means (S604). When it is determined that there is the traffic jam section ahead of the present vehicle position based on the received traffic jam information, the electric power consumption computing means (S602) computes an electric power consumption of the battery 9 that drivers the motor 3 while the vehicle is operated on the traffic jam section with the motor 3 as the power source. The necessary battery residual amount specifying means (S604) specifies the necessary battery residual amount required at the entrance point of traffic jam section based on the electric power consumption. For example, the necessary battery residual amount enables the battery residual amount to remain equal to or greater than the predetermined lower-limit standard value at the end point of traffic jam section even when the vehicle is operated on the traffic jam section under with the motor 3 as the power source. Accelerator operation schedule defining means defines the schedule of the recommended running mode such that the following conditions are satisfied. (a) For one or more sections upstream of the entrance point of traffic jam section, the recommended accelerator operation is set as an accelerator operation, in which the vehicle is operated for allowing the battery 9 to be charged such that the battery residual amount at the entrance point of traffic jam section becomes equal to or greater than the necessary battery residual amount: (b) For the traffic jam section, the recommended accelerator operation is set as another accelerator operation, in which the vehicle is operated such that the motor 3 is used as the power source. Then, the range of the accelerator pedal position, which corresponds to the recommended running mode suitable for achieving the enhanced fuel efficient running in the road section, in which the vehicle is located, is displayed. As a result, the battery 9 is successfully charged in advance of the traffic jam section. Thereby, even when the vehicle is operated on the traffic jam section under a certain running mode, in which the motor 3 is exclusively used as the power source, it is possible to keep the battery residual amount equal to or greater than the predetermined lower-limit standard value, and it is still possible to achieve the running of the vehicle with effectively enhanced fuel efficiency.

It should be noted that the accelerator operation schedule defining means may alternatively define the schedule of the recommended running mode when it is determined that the battery residual amount at the entrance point of traffic jam section is estimated to become less than the necessary battery residual amount in a certain running mode, in which the motor is used as the power source until the vehicle reaches the entrance point of traffic jam section.

Because the electric power consumption of the accessories tend to become greater in a high stopping frequency section, such as the traffic jam section, which section has high stopping frequency, the battery residual amount tends to become less than the lower-limit standard value while the vehicle stops in the high stopping frequency section. As a result, the charge of the battery by activating the engine may be required in the conventional art. Thus, in the present embodiment, the charge amount of the battery is increased in advance of the traffic jam section by operating the vehicle under the hybrid drive at the section upstream of the traffic jam section although the efficiency may temporarily become worse than usual. As a result, even when the vehicle is often operated under the motor drive in the traffic jam section, it is possible to keep the battery residual amount equal to or greater than the lower-limit standard value in the traffic jam section. Thereby, because the battery residual amount is successfully kept equal to or greater than the lower-limit standard value, the engine is not required to be activated for charging the battery, and thereby the fuel efficiency is more effectively improved compared with the conventional art. As a result, in a case, where it is determined that there is the traffic jam ahead, by defining the schedule of the recommended running mode as above, it is possible to limit the battery residual amount from reducing to below the lower-limit standard value even when the vehicle is operated under the EV running mode on the traffic jam section. More specifically, in the schedule of the recommended running mode, the vehicle is intentionally frequently operated under the hybrid drive on the section upstream of the traffic jam section such that the battery is effectively charged before the vehicle reaches the traffic jam section. As a result, it is possible to operate the vehicle as required under the EV running mode in the traffic jam section, and thereby it is possible to effectively improve the total fuel efficiency over the entirety of the route to the destination.

(Other Embodiment)

The first and second embodiments shows examples, in which the control target value (the target SOC) of the charge amount of the battery for the motor is employed as the control index, and the schedule of the control index is defined. However, the control index is not limited to the target SOC. Alternatively, data other than the target SOC may be employed as an alternative control index, and the schedule of the alternative control index may be defined instead. In an example case, the SOC at the time of entering a certain section may be referred to as "b", and the SOC at the timing of exiting the certain section may be referred to as "c". In the above example case, any value may be employed as the alternative control index provided that it is possible to change the SOC from "b" to "c" as required in the certain section.

Also, in the first and second embodiments, the schedule of the recommended running mode is defined for the route from the origin to the destination. However, the schedule of the target SOC is not necessarily defined for the entirety of the route from the origin to the destination. For example, the schedule of the recommended running mode may be defined only for any section in the route from the origin to the destination such that the enhanced fuel efficient running is achieved.

Also, in the first and second embodiments, when the vehicle reaches the destination, the schedule of the target SOC is defined for each road section in the route from the origin to the destination such that the enhanced fuel efficient running is achievable. Then, the schedule of the recommended running mode for each road section in the route from the origin to the destination is defined based on the schedule of the target SOC such that the enhanced fuel efficient running is achievable. Then, each of the defined schedules is stored in the permanent storage medium 23. However, the timing of defining the schedule of the target SOC and the timing of defining the schedule of the recommended running mode are not limited to the above timing shown in the embodiments.

Also, in the first to third embodiments, at S510, the range of the accelerator pedal position that corresponds to the recommended running mode is displayed in the indicator that indicates the present accelerator pedal position. However, the above indicator that indicates the present accelerator pedal position may be alternatively replaced with another indicating method or device that enables the driver to recognize the recommended running mode in order to guide the accelerator operation.

Also, in the first embodiment, at S510, the range of accelerator pedal position that corresponds to the recommended running mode is displayed such that the range flashes on and off at the indicator. However, the range of accelerator pedal position that corresponds to the recommended running mode may be displayed by other method other than flashing the range on and off at the indicator. For example, the display of the range of accelerator pedal position that corresponds to the recommended running mode may be always on by a color different from the color of the surroundings.

Also, in the first and second embodiments, in the running-time process shown in FIG. 10, the route from the origin to the destination specified by the operation of the occupant is specified as the schedule section. However, the destination is not necessarily specified through the occupant operation. For example, when the road, on which the vehicle is presently running, coincides with the route stored in the running history, the destination of the route in the running history may be set to the destination of the present running.

Also, in the third embodiment, when it is determined, based on the traffic jam information, that there is the traffic jam section ahead of the present position of the vehicle, the schedule of the recommended running mode is defined based on the traffic jam information. However, the above operation is not limited to the traffic jam section. For example, when it is determined, based on the traffic jam information, that there is a congestion section, which is relatively congested, ahead of the present vehicle position, the schedule of the recommended running mode may be defined based on the traffic jam information similar to the case of the traffic jam.

It should be noted that the process of specifying the present position based on the information, which is obtained from the GPS receiver 11, the azimuth sensor 12, and the vehicle speed sensor 13, corresponds to the present position specifying means. Steps S308 and S606 correspond to accelerator operation schedule defining means. Step S306 correspond to control index defining means. Step S510 corresponds to display means. Step S200 corresponds to information storing means.

Additional advantages and modifications will readily occur to those skilled in the art. The invention in its broader terms is therefore not limited to the specific details, representative apparatus, and illustrative examples shown and described.

What is claimed is:

1. A drive control device mounted to a hybrid electric vehicle that has an engine and a motor as a running power source, wherein the hybrid electric vehicle runs under a plurality of running modes that are switched in accordance with accelerator operation, wherein the drive control device performs a drive control of the engine and the motor, the drive control device comprising:
   means for specifying a present position of the vehicle;
   means for defining a schedule of a control index, which is a target value of a battery charge amount for a battery that drives the motor, for each of a plurality of sections in a route from an origin to a destination in order to achieve an enhanced fuel efficient running of the vehicle,
   means for defining a schedule of a recommended accelerator operation for each of the plurality of sections in the route from the origin to the destination based on the schedule of the control index in order to achieve the enhanced fuel efficient running of the vehicle, the recommended accelerator operation being defined as a recommended accelerator pedal position; and
   means for displaying the recommended accelerator pedal position for a present section of the plurality of sections, in which section the vehicle is presently located, in accordance with the schedule of the accelerator operation and the present position of the vehicle; wherein
   the plurality of sections includes a battery charge section, in which the target value of the battery charge amount is increased;
   the defining means defines the schedule of the recommended accelerator operation for the battery charge section such that the accelerator operation is executed in order to allow the battery to be charged in the battery charge section;
   the displaying means includes an indicator configured to display an area indicating an accelerator pedal position of the vehicle, the area increases with an increase of the accelerator pedal position in order to indicate the accelerator pedal position of the vehicle to an operator; and
   the recommended accelerator pedal position and the accelerator pedal position displayed by the displaying means guide the operator to depress an accelerator pedal of the vehicle so that the accelerator pedal position of the vehicle is equal to the recommended accelerator pedal position for the present section.

2. The drive control device according to claim 1, wherein:
   the plurality of sections includes a battery consumption section, in which the target value of the battery charge amount is reduced; and
   the means for defining the schedule of the recommended accelerator operation defines the schedule of the accelerator operation for the battery consumption section such that the accelerator operation is executed in order to limit the battery from being charged in the battery consumption section.

3. The drive control device according to claim 1, further comprising:
   means for collecting running information, which is used for defining the control index, for each of the plurality of sections while the vehicle runs and for causing a storage device to store therein the running information, wherein:
   the means for defining the schedule of the control index defines the schedule of the control index for each of the plurality of sections based on the running information stored in the storage device in order to achieve the enhanced fuel efficient running of the vehicle.

4. The drive control device according to claim 1, wherein:
   the displaying means highlights a range of the recommended accelerator operation for the present section, on the indicator.

5. The drive control device according to claim 1, wherein:
   the displaying means includes an indicator configured to display an area indicating the accelerator pedal position, which area changes with a change of the accelerator pedal position at a rate different for each of the plurality of running modes, in order to indicate the accelerator pedal position of the vehicle; and
   the displaying means always displays a range of the recommended accelerator operation for the present section, at a predetermined position on the indicator.

6. The drive control device according to claim 1, wherein the control index for each section in the route is a specific battery charge amount for the battery at an end point of the section in the route.

7. The drive control device according to claim 1, wherein the recommended accelerator pedal position is the accelerator pedal position which will achieve the enhanced fuel efficient running of the vehicle.

* * * * *